United States Patent
Moy

(10) Patent No.: US 11,105,748 B2
(45) Date of Patent: Aug. 31, 2021

(54) GEMSTONE VALUATION APPARATUS

(71) Applicant: Ashley Elizabeth Moy, New York, NY (US)

(72) Inventor: Ashley Elizabeth Moy, New York, NY (US)

(*) Notice: Subject to any disclaimer, the term of this patent is extended or adjusted under 35 U.S.C. 154(b) by 100 days.

(21) Appl. No.: 16/371,518

(22) Filed: Apr. 1, 2019

(65) Prior Publication Data
US 2019/0302029 A1 Oct. 3, 2019

Related U.S. Application Data

(60) Provisional application No. 62/651,071, filed on Mar. 30, 2018.

(51) Int. Cl.
| | |
|---|---|
| G01N 21/87 | (2006.01) |
| A44C 25/00 | (2006.01) |
| A44C 9/00 | (2006.01) |
| A44C 5/00 | (2006.01) |
| A44C 17/02 | (2006.01) |
| A44C 15/00 | (2006.01) |
| A44B 15/00 | (2006.01) |

(Continued)

(52) U.S. Cl.
CPC ........... G01N 21/87 (2013.01); A44B 15/005 (2013.01); A44C 5/0015 (2013.01); A44C 7/00 (2013.01); A44C 9/0053 (2013.01); A44C 15/005 (2013.01); A44C 17/007 (2013.01); A44C 17/02 (2013.01); A44C 25/001 (2013.01)

(58) Field of Classification Search
CPC ............... G01N 21/87; G01N 21/6447; G01N 2021/6463; G01N 21/293; A44C 9/0053; A44C 9/00; A44C 17/02; A44C 5/0015; A44C 17/007; A44C 25/00; A44B 15/005

USPC ..................................................... 63/1.11, 15
See application file for complete search history.

(56) References Cited

U.S. PATENT DOCUMENTS

| | | | | |
|---|---|---|---|---|
| 4,527,895 A | * | 7/1985 | Rubin ....................... | G01J 3/52 283/114 |
| 4,534,644 A | * | 8/1985 | Beesley .................... | G01J 3/52 356/30 |

(Continued)

FOREIGN PATENT DOCUMENTS

CN 206960367 U 2/2018

OTHER PUBLICATIONS

Annello by Kobelli 14k White Gold 1 3/4ct.Tw Hexagon Halo Blue Sapphire and Mixed White Gemstones Bridal Rings Set; https://www.overstock.com/Jewelry-Watches/Annello-by-Kobelli-14k-White-Gold-1-3-4ct.tw-Hexagon-Halo-Blue-Sapphire-and-Mixed-White-Gemstones-Bridal-Rings-Set/25715975/product.html.

(Continued)

Primary Examiner — Jack W Lavinder
(74) Attorney, Agent, or Firm — Blair R. Lanier

(57) ABSTRACT

The embodiments set forth a jewelry accessory setting for an array of stones, such as gemstones including for instance diamonds, where said stones are arranged in accordance to a gradient of known quality, such as cut, clarity, carat or color. The jewelry accessory may include bars between each stone to prevent color contamination. The jewelry accessory alternatively sets forth natural stones together with treated or synthetics stones. The jewelry accessory is useful when utilized in a method of valuing stones of unknown quality, such as by a purchaser assessing the value of a piece of jewelry with stones of unknown quality by comparing such potential purchase to the jewelry accessory set forth herein.

5 Claims, 4 Drawing Sheets

(51) Int. Cl.
*A44C 17/00* (2006.01)
*A44C 7/00* (2006.01)

(56) References Cited

U.S. PATENT DOCUMENTS

| | | | | |
|---|---|---|---|---|
| 4,821,533 | A | 4/1989 | Bonnefoy | |
| 5,005,971 | A * | 4/1991 | Davis | G01J 3/52 356/30 |
| 5,064,281 | A * | 11/1991 | Davis | G01J 3/52 356/30 |
| 5,143,212 | A * | 9/1992 | Roberts | G01J 3/52 206/223 |
| 10,352,868 | B2 * | 7/2019 | Kessler | B65D 51/248 |
| 10,859,505 | B2 * | 12/2020 | Geurts | G01N 21/88 |
| 2011/0302958 | A1 | 12/2011 | Mardkha | |
| 2016/0113362 | A1 | 4/2016 | Roux-Fouillet | |
| 2019/0234886 | A1 * | 8/2019 | Geurts | G01N 21/88 |

OTHER PUBLICATIONS

Multi Colored Natural Round Diamonds Band in 18k White Gold Ring; https://upper-luxury.com/product/upid2/.
14K White Gold 0.75ct TDW Treated Blue Diamond Floral Ring; https://www.overstock.com/Jewelry-Watches/14K-White-Gold-0. 75ct-TDW-Treated-Blue-Diamond-Floral-Ring H-I-l1-I2/20870576/product.html.
Donald Clark; What Happened to the GIA GemSet Color and Hue Wheel?; https://www.gemsociety.org/article/what-happened-to-the-gia-gemset-color-and-hue-wheel/.
Diamond & Stone Estimator Gauge; https://www.ebay.com/itm/233993616580?hash=item367b1b3cc4:g:-fsAAOSwS-RfA1W5.
Master Stone-Setting System; https://www.riogrande.com/product/master-stone-setting-system-1-520mm/118962.
Stardust Five Light Diamond Ring Diamonds, Gold; Jun. 27, 2017; http://www.abchome.com/shop/xiao-wang-stardust-five-light-diamond-ring-diamonds-gold-1500494.
Prism Jewel 0.65Ct Round Multi Color Diamond & Natural Diamond Cluster Ring—Ice-Blue/Brown/White G-H; https://dcec.diamondcouncil.org/Documents/CourseMaterials/DiamondCourse/D_Lesson_04.pdf.
The Diamond Course; 2015; https://dcec.diamondcouncil.org/Documents/CourseMaterials/DiamondCourse/D_Lesson_04.pdf.
Diamond Seller Gauge; Apr. 2015; https://www.riogrande.com/product/diamond-seller-gauge/116469.
CZ Master Set Pro; https://www.lacytools.ca/CZ-MASTER-SET-PRO-0-50CT-10-STONE-SET-p/1935.htm.
Milsons Findings Catalog; 2010; p. 44; http://www.milsonsfindings.com/html/true/2010catalog-044.html.

* cited by examiner

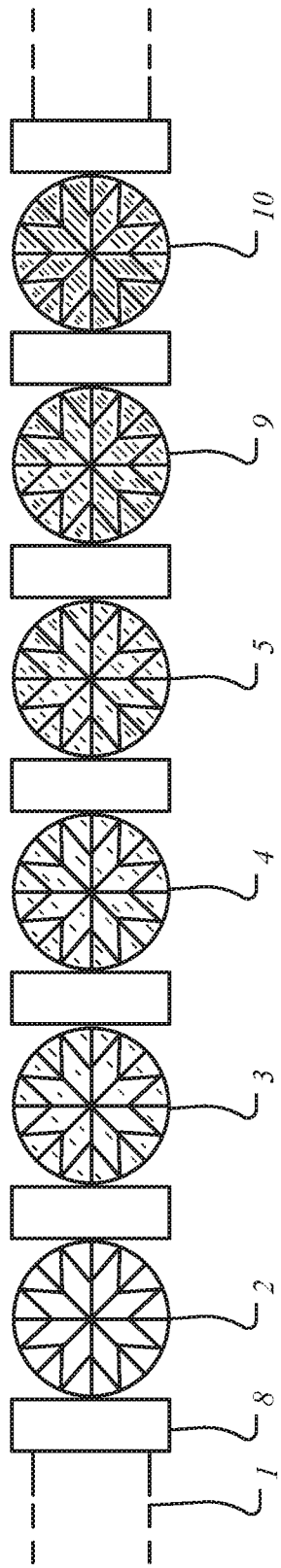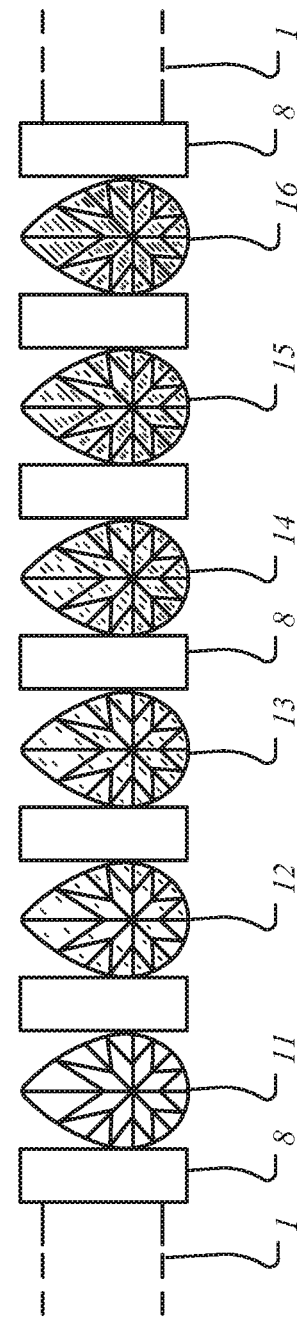
FIG. 3
FIG. 4

GEMSTONE VALUATION APPARATUS

CROSS REFERENCE TO RELATED APPLICATIONS

This application claims priority to and incorporates by reference U.S. provisional patent application 62/651,071 filed Mar. 30, 2018.

STATEMENT REGARDING FEDERALLY SPONSORED RESEARCH OR DEVELOPMENT

Not Applicable

BACKGROUND

Gemological laboratories such as the Gemological Institute of America (GIA) were founded to provide a neutral ground for a transaction to occur between parties trading diamonds and gemstones. Given that minerals and gems tend to form under natural geological and chemical processes, their value is determined by a combination of certain qualities, rather than a calculated and consistent value.

The science of gemology became key to understanding the quality and therefore worth, of these gemstones, diamonds, and jewelry. The factors that must be considered when evaluating a stone became known as the 4Cs: color, cut, clarity, and carat. Stones include gemstones as well as other stones used in jewelry, and gemstones include diamonds. Stones shall be understood to include synthetics, imitations, and treated stones.

The GIA is the current standard in the jewelry industry, establishing the language criteria used worldwide for describing diamonds and gemstones. GIA terminology is based under criteria specific to each of the 4Cs. Diamonds are the most sensitive to the 4C grading scale, given their popularity and extremely high value. Each of these 4Cs is discussed below.

Color: Color is observed based upon the combination of three factors: (1) hue, which is overall body color, (2) tone, which is the depth of the hue, and (3) saturation, which is the vibrancy of the hue. Diamonds are generally graded along a strict color range: their color is specified along a scale ranging from D (colorless) to Z (tinted without being a fancy color). The D-Z gradation applies to white diamonds, but diamonds can exist in every color.

The color grading process in labs generally utilizes tools of diamond master stones and a light viewing dock. With the master stones face down on the shelf of the dock under a specific level of light, the gemologist places the stone being identified, which must be loose, face down along the master stones. It is through comparison under these conditions that the gemologist grades the color of the loose diamond. Color, as one of the 4Cs, is extremely important because between certain colors and color ranges, the value of a diamond can vary by over hundreds and thousands of dollars.

Outside of the D-Z range, the hues of colored diamonds include: brown, grey, pink, blue, yellow, red, etc. These are understood as fancy colors, and can exist in multiple combinations of hues (e.g.: purplish-pink, green-blue, etc.). Like white stones, such colored stones need to be graded loose and exposed to the light of a viewing dock. Also like white diamonds, slight variations in color can result in huge differences in value. Color strength is typically classified as one of the following: faint, very light, light, fancy light, fancy, fancy intense, fancy vivid, fancy dark and fancy deep.

Fluorescence of a diamond acts as a sub-section of color, where fluorescence intensity can even affect a diamond's overall body color. Sometimes a fluorescence that is too high will make the stone appear milky and hazy, lowering its value tremendously. Fluorescent grading can be classified as faint, medium, strong, or very strong, according to the amount light the diamond emits when placed under an ultraviolet light.

Cut: The cut of the diamond is graded based on the combinations of proportions that a diamond possesses. Based on the quality of these proportions, the way light travels through a diamond is greatly affected. Therefore, if a diamond is cut too deeply, too shallowly or asymmetrically, the less brilliance it will display and the lower the diamond's value. Laboratories are able to provide precise measurements using laser imaging; however, cut can be evaluated wholly with the naked eye because of how light is expressed throughout the stone. Along with the overall arrangements of facets, cut is a combination of polish quality and symmetry. The cut grades most commonly understood are: poor, good, very good, and excellent/ideal.

Clarity: Refers to the material in the stone itself. A diamond can fall into categories ranging from Flawless to Included, which refers various features/inclusions within the stone that may affect beauty and durability. The exact spectrum contains: Flawless [FL], Internally Flawless [IF], Very-Very Slightly Included [$VVS_1$-$VVS_2$], Very Slightly Included [$VS_1$-$VS_2$], Slightly Included [$SI_1$-$SI_2$], and Included [$I_1$-$I_3$]. Based on these grades, the overall appearance of the diamond may be influenced. Material will generally appear clean to the naked eye at grading of $VS_2$ clarity and above, while $SI_1$ and below may vary greatly in overall appearance based on the severity and nature of its inclusions. The way the diamond displays these features is what determines its value.

Examples of common diamond inclusions include: dark crystal, light crystal, cloud, chip on the girdle, internal graining, needle inclusions, natural crystal skin on girdle, bearding along the girdle, and triangular growth patterns or trigons. Chipped corners additionally reduce a diamond's value.

Carat: The weight of a diamond is understood in carats and points. Carats represent the large size, while points are the denoting numbers of a single carat. It takes 100 pts (points) to equal a carat, and a carat is $\frac{1}{5}^{th}$ of a gram. The most popular and highest demanded size is a 1.00 ct diamond. However, in terms of global yield, it takes approximately 2 tons of mineral bearing ore to produce 0.50 cts of diamonds, so therefore it is very rare and expensive to uncover a large enough rough diamond to manufacture into a full-cut, 1.00 ct round brilliant diamond. It is also important to note that a diamond crystal from the mines may lose over 50% of its original weight when subjected to cutting and polishing. Carat is ultimately what determines the significant worth of a diamond: it is the characteristic people notice in a diamond, and therefore, carat is the most important number after monetary cost to the average consumer. At times, the quality of the other 3Cs may be sacrificed to maximize a diamond's carat weight.

The $5^{th}$ C—Cost: The price of a diamond is ultimately driven by supply and demand, much like any other industry. However, given that rough diamonds are a natural resource while also being a luxury, they are subject to heavy regulations and economic burdens. Naturally, as a diamond moves down the pipeline, it goes through a transformative process that will help it fall into the hands of a consumer at the end. At every stage of the process, value is added to the diamond, but once it reaches the wholesaler who no longer is part of the manufacturing process, it becomes very unclear what the perceived value should be. Hence, the industry has developed guides and methods to remedy the market.

For example, the Rapaport Diamond Report is one such valuation guide. Colloquially known as "The Rap Sheet" within the industry, these sheets represent the base value a diamond of a certain carat, color, and clarity criteria should be, expressed in $100s at price per carat. This allows vendors to make educated calls when it comes to buying and selling inventory to others in either the wholesale or retail market. However, the final dollar price of the diamond may come out higher or lower than the amount proposed on the Rap Sheet. Up until this point, the Rap Sheet has been one of the best resources that quantify the 4Cs to determine the value of a diamond. For some criteria, such as clarity, there can be a $32,500/CT, and therefore, a $325,000 total price difference depending on grading. Even a difference in one clarity grade with all else remaining constant can result in a huge price discrepancy. Hence, gemological education and labs are highly important in the industry.

Synthetics and Treatments: For the less than desirable diamonds, the practice of treatments and "enhancements" play a role in the industry. While such treatments hold very little value in the wholesale market if not crossing into techniques considered unscrupulous in the industry, enhancing treatments still circulate between customer and vendors, sometimes with minimal to no disclosure. Some common treatments are listed below:

Fracture Filling is a technique utilized when a glass or a highly refractive transparent substance is injected into the open cracks of a diamond, hence disguising the diamonds apparent clarity. Fracture Filling is very hard to distinguish, but the treatment sometimes may show a distinctive color due to a phenomenon known as the "Flash Effect".

Laser Drilling is a technique that causes permanent damage to a diamond by boring a hole with a laser beam in order to eradicate a very noticeable inclusion. A technician can erase an inclusion by destroying it within the diamond or bleaching it white so that the inclusion is no longer easily visible. Internal Laser Drilling may not display an entry hole at all, but the stone would still be considered treated and therefore significantly discounted if sold.

Synthetics or man-made diamonds are significantly less expensive to produce than mining natural diamonds, and synthetics' competition in the market may lower the value of the natural diamond. There are two types of synthetic diamonds, and both varieties can be optically identical to their natural counterpart. One of the few ways outside of advanced testing to determine if a diamond may be synthetic is through fluorescence and identification of inclusions distinctive of synthetics, like metal platelets.

Colored stones in the industry: Outside of diamonds, a smaller percentage of the jewelry industry is occupied by the entirety of other gemstones and minerals. This includes all organics, ornamental, synthetic/manmade, and crystalline material. While such stones do not have as comprehensive of a grading system as diamonds, they do adhere to the 4Cs, with a strong emphasis on color, which in some cases, solely determines the stone's price.

Like diamonds, colored stones can be subjected to treatments, imitations, and laboratory synthesis. However, given their dwarfed status in the industry and variety in forms, it is more difficult to apply a standard to the perfect gemstone. The bigger challenge that consumers and experts face is authenticity and disclosure of treatments, such as oil treatments in emeralds or other treatment that might hide inclusions.

The diamond market faces a problem. Gem laboratories are extremely helpful in identifying, and classifying gemstones. However, the process is very expensive and labs worldwide have been growing more and more inconsistent with their grading, despite the gemological language remaining the same. For now, the most recognized, and most expensive authority that the industry turns to is the GIA.

In addition to basic grading fees, gem laboratories assess additional charges for supplementary services such treatment and origin testing, or inscribing a report number, or even a sentimental message, in a stone. This adds to the overall cost that the owner must consider when they need to sell their diamond, but most transactions will not take place without the certainty of a GIA report, despite the seller already possessing a strong knowledge of diamonds. Further, a stone owner may pay a rechecking fee nearly doubling their expenditures if they doubt or disagree with the GIA report, which is not too uncommon. Given the inconsistencies of the GIA and other labs in within the past eight years, many labs now include a "rechecking" fee, which is used as a deterrent for patrons to really understand the identity of their diamond, as they cost as much as 75% of the original report price. This is a dilemma in addition to general stone grading being so volatile that many vendors need to regularly update their reports once they age past six months or longer to prevent disputes with potential traders. That means the cost of the diamond may increase significantly with every year that it does not sell, even though the diamond itself remains the same.

Looking past the general grading of a stone, one of the major problems behind a gem lab is the requirement for a stone to be unmounted to be evaluated. Most diamonds are already set in jewelry, and unfortunately, many beautiful and costly pieces of art have been damaged and ruined just for one diamond to be submitted to a lab for a report. While this problem does not greatly affect modern pieces of jewelry due to the common practice of stone reports prior to being set in the mounting, the dilemma persists for classic and antique pieces in which the diamonds do not have the same traceability as stones set in modern jewelry. Many labs jeopardize permanently damaging antiques by forcibly removing the stone, only to be sold again in the same mounting. However, any slight alteration will reduce the original value due to the jeweler's intervention in working on the piece. Considering this risk, many owners would prefer to sell their pieces outright, rather than risking such value loss for a precise stone appraisal. This means the most sellers of antique diamond jewelry fail to learn the true value of their property, instead reliantly investing a great deal of lot of trust in purchasers offering a fair price; the fact that the valuation process risks devaluation defeats the original purpose of a gemological laboratory.

Several additional processes for the color grading of diamonds are possible through labs. The GIA laboratory compares all diamonds face down to determine their color, but diamonds' color should also be understood face up to account for how an individual diamond takes in the color of its surroundings, including its mounting. The same can also be applied to the fluorescence of a diamond. Regarding fancy shaped diamonds, it leaves room for error, because by comparing a round shape to a non-round shape, there's a significant difference in the way light is expressed through the stone. The round brilliant cut was designed and perfected to maximize the passage of white light, where fancy shaped stones would otherwise be incapable of expressing light the same way. This means a fancy shaped diamond and round diamond with an equivalent color will appear differently. However, master stones only are offered as round shapes, which leads to a less than straightforward understanding of color in a diamond for those not experienced in color grading.

The practice of accurately weight-estimating diamonds is a difficult skill to establish. As recently as December 2017, an up and coming consignment company The RealReal faced a five million dollar lawsuit regarding over-estimating the size of the diamonds set in jewelry the company was selling. One claimant had a discrepancy of 0.92 ct in the jewelry she purchased. Weight discrepancies are not an unusual dispute within the industry: many gemologists and appraisers, while they may be experts in the theory of gemology, still struggle with a task as simple as weight estimation, especially if they are unfamiliar with common stone dimensions. A discrepancy of a 0.01 ct difference in estimation can lead to a sizable error, a common example is a piece of jewelry with 500 round stones that are all 1.30 mm in diameter. Within this range, the diamonds are most likely 0.01 ct each. If an appraiser were to carelessly measure a stone as 1.75 mm (less than half a millimeter difference), the appraiser would assume the size is 0.02 ct (a one point difference). This would then translate to 500*0.01 ct=5.00 ctw in a piece of jewelry, or as the appraiser calculated: 500*0.02 ct=10.00 ctw. Such minor differences in measurement can result in a massive discrepancy in the quality of diamonds appraised versus actually within the piece, all because of a 0.01 ct difference. This situation may not always be avoidable because of how some jewelry is built, where measuring the size of the diamonds are not straightforward or easy to achieve. As a result, many gemologists and appraisers will conduct the opposite and conservatively measure the size of the diamonds within a piece, to avoid a negative price discrepancy or a lawsuit. However, this also means the potential for a seller to rely on a low appraisal, resulting in financial loss as well.

Synthetic and treated diamonds and gemstones alike have left participants at every level of the diamond trade paranoid. Many market participants outside of gemological laboratories remain uneducated in understanding and identifying treatments, and while the fear is pervasive, there is simply not enough research available to the public regarding the extent of the practice. While submitting a questionable stone to a lab is a conclusive option, a vendor must still consider a significant service fee from a lab, along with a report that omits any explanation as to the stones' treatment or synthesis. Labs will often not disclose where a stone is treated, nor provide further evidence for the owner to see for themselves. In most cases, patrons assume treated stones and synthetic stones have no value; however, most market participants have no way identifying for themselves if a stone is natural or not on their own. Some market participants can even become trapped in a bad purchase because of how familiar they are with treated/synthetic material. This kind of situation can break decades long business relationships and destroys consumer trust, even though it is no exception that the vendor is unaware of possessing false material.

Hence, there exists a need in the art for precise valuation of diamonds and other gemstones. Such new method should be able to value and grade diamonds or other stones already set in jewelry so as to prevent damage to the stone in removing the stone from its setting and then setting again. A new method should be easy to use by participants in every level of the diamond and gemstone market, not by laboratories only. A method easy to use will allow for balance and informed decisions by both buyers and sellers. Finally, a new method should be able to distinguish and grade diamonds or other stones along the 4Cs: 4Cs: color, cut, clarity, and carat.

BRIEF SUMMARY OF THE INVENTION

The embodiments presented herein set forth a jewelry accessory comprising an ordered array of at least four diamonds on the D-Z color gradient scale set forth in an ordered array in accordance with each stones' D-Z color. The accessory may also include diamonds outside the D-Z scale.

Also presented is a method of valuing stones of unknown value as one might when considering a purchase to a jewelry accessory setting forth stones of known quality arranged wither by weight or color.

Further presented is a jewelry accessory setting forth and ordered array of at least four gemstones, each varying in accordance with at least one category of clarity, fancy cut shape type, fancy cut shape quality, or photoluminescence. A method a valuing jewelry comprising comparing an unknown stone to the aforementioned jewelry accessory is additionally introduced. A kit including an ultraviolet light and the aforementioned jewelry accessory is set forth.

Finally, a jewelry accessory featuring at least one natural gemstone and at least three stones that are either synthetic, imitation or treated gemstones each in a different manner, is also set forth. Also introduced is a method of valuing jewelry based on comparing an unknown stone to the aforementioned jewelry accessory.

BRIEF DESCRIPTION OF THE SEVERAL VIEWS OF THE DRAWING

FIG. 3 displays round brilliant cut stones set forth in a color gradient array in the framework of a jewelry accessory.

FIG. 4 illustrates a color gradient of fancy cut pear shape stones set forth in a color gradients array in the framework of a jewelry accessory.

DETAILED DESCRIPTION OF THE INVENTION

Figure 1:
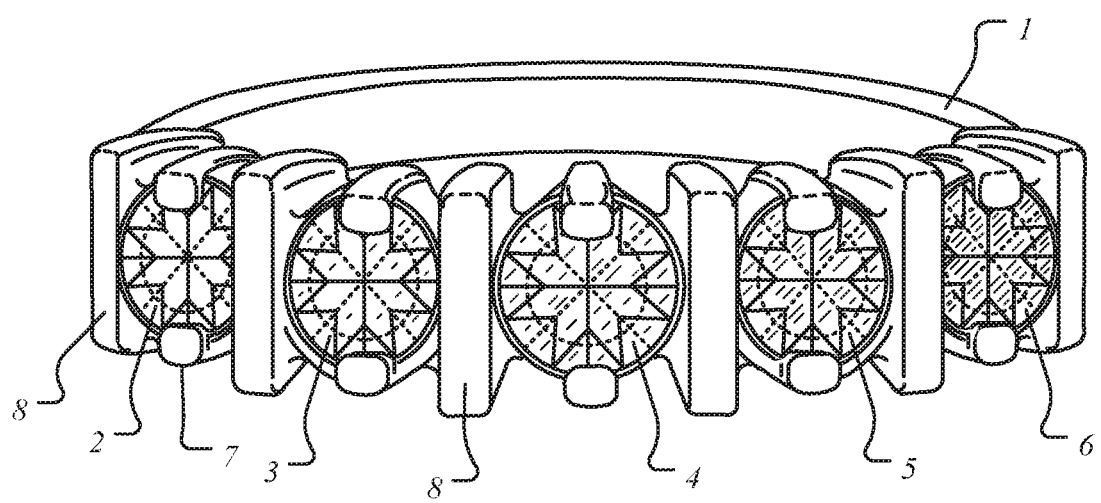
FIG. 1 shows the jewelry accessory in the form of a ring comprising stones arranged along a color gradient and set within a framework.

Presented herein is an apparatus such as a jewelry accessory that allows side by side comparison of identified materials to an unknown material. The apparatus may be portable, wearable, and safe to handle for those experienced as well as those unexperienced with jewelry. The apparatus holds and organizes comparison materials such as diamonds or other gemstones in a convenient, easy, and obvious way. The organization of the materials in the apparatus allows the user to affirm the identity and qualities of an unknown/obscure material when compared to those materials in the apparatus. Within the apparatus, stones such as gemstones or more specifically diamonds, are arranged in a known and obvious fashion indicating for instance a gradient of quality and change in type. For instance, diamonds may be arranged in a gradient of clarity, cut, carat or color. The comparison materials would be a known and identified material, it would be the archetypal form of the material it is meant to identify.

This would be an empirical method to identify a stone on the spot, with minimal guesswork.

The purpose of the embodiments presented herein is to provide a way for business owners to restore a level of skill that many business owners have lost to the labs they once trusted but now doubt to provide an accurate estimation of the quality of their jewelry. The embodiments presented herein allow business owners, consumers, or others in the diamond and gemstone market to affordably identify stones and grading themselves, thus verifying reports of labs or reducing the need for such reports in many situations. This invention would alleviate the need for basic gemological laboratories and service fees. The standards of grading would be restored because resources are now readily available and understandable, even for those who are not as skilled as laboratory gemologists. The embodiments presented herein would provide a business owner with a means to properly take responsibility for the goods they are selling and point out to customers distinctions in the quality of the jewelry they consider purchasing.

The invention can be used in any environment, which means a specialized light and atmosphere would not be necessary to accurately grade an unknown material. When used between two parties that intend to do business, there would be no need to argue over the identity of a stone because the apparatus described herein would provide proof of quality which the parties could check against. Selective vendors can build layouts (sets of matching stones) by quickly matching specifically selected stones to the apparatus. Sorting and moving large quantities of small stones would certainly be expedited by having the decisive instrument described herein in hand.

Appraisers and insurers who write documents usable in a court of law would be able to accurately identify and record every aspect of a piece of jewelry without the need of a lab, while remaining authentic in description and ethical in practice. This tool is especially useful for appraisers because the jewelry does not need to be unmounted to grade stones. The tool is also practical for grading multiple stones at once. Smaller stones and stones that are too low of a quality to consider for lab testing could be identified with confidence. Measurements become more comparable and consistent, mitigating the error of over or underestimating stone weights. Overall, the process of evaluating a piece of jewelry would be greatly simplified by utilized the tool described herein and not as opinion-based.

By using obvious specimens, the user is forced to practice an ethical standard. There is no hiding the nature of diamonds and gemstones previously were purchased without certainty as to quality. This invention will provide embodiments that create a distinction in materials at both the lowest and highest qualities available, including treated, synthetic and natural gemstones, alike. Value will be added as a synthetic/treated material can be used to distinguish other stones like it from natural stones. The apparatus described herein can be used to identify value for stones which might not typically have been sent to a laboratory, thereby not replacing laboratories, but supplementing their function.

Whomever uses the invention will be able to easily identify the stones in their possession, eventually being able to skillfully understand and identify, regardless of formal training or not. By being able to rely on their own competence, consumers, retailers and wholesalers approach a fair market that leaves minimal debate over a potential purchase. Anyone can distinguish the difference in the 4Cs by applying this invention. Given its flexibility, the arrangement of comparisons can be customized, tailored, and perfected for basic use or a specialized niche.

The invention may take on various embodiments, including but not limited to those described herein and illustrated in the Figures. The apparatus can take the form of numerous embodiments, such as wearable jewelry, including rings, bracelets, watches, key rings, pendants, and portable stations. The apparatus may further be a watch band, keychain, lanyard, jewelers' tool or tweezers, handheld tool or pen. The apparatus may comprise material in addition to the gemstones such as but not limited to white gold, yellow gold, steel, copper, and silver. The gemstones of the apparatus may include natural, synthetic, lab-created, ceramic, or other imitations of natural gemstones. A user utilizes the tool to determine the value of an unknown stone, which may either be set in jewelry or loose, by comparing the unknown stone to the stones of the tool and determining which stones of the tool the unknown stone most closely resembles.

The specimen set forth in FIG. 1 is a physical rendering of one of the invention's embodiments. The embodiment takes the form of a wearable jewelry ring. In one embodiment, the ring comprises diamonds set in white gold, though the ring may also be manufactured out of other metals such as yellow gold, steel, copper, and silver, and the stones set in the ring may be gemstones other than diamonds or other stones or synthetics. The ring features a framework 1 into which are set four stones 2, 3, 4, 5 representing at least four different gradient values from within the D-M color range, and the ring further features a fifth stone 6 outside of the D-Z range, for example a diamond that is brown in hue. The stones 2, 3, 4, 5 may represent at least four different gradient values on the D-Z color gradient scale, where the stones 2, 3, 4, 5 may be set in gradient value order, and the fifth stone 6 may be set beside the darkest stone on the D-Z scale. The invention may be wearable to the user. A casual observer may not at first recognize the apparatus as a tool to be used for identification of gemstones. The apparatus can be used under any light source and still provide an accurate measure for identifying an unknown material when used for side by side comparison with a test stone separate from the apparatus. The stones which may for example be diamonds are secured by prongs 7. Bars 8 between each stone reduce color contamination of one stone to another. The bars 8 in FIG. 1 extend either to the top height of the diamonds or very slightly above. The height of the bars allows maximum ambient light to enter the diamonds while preventing color contamination from one diamond to its neighbor.

Figure 2:
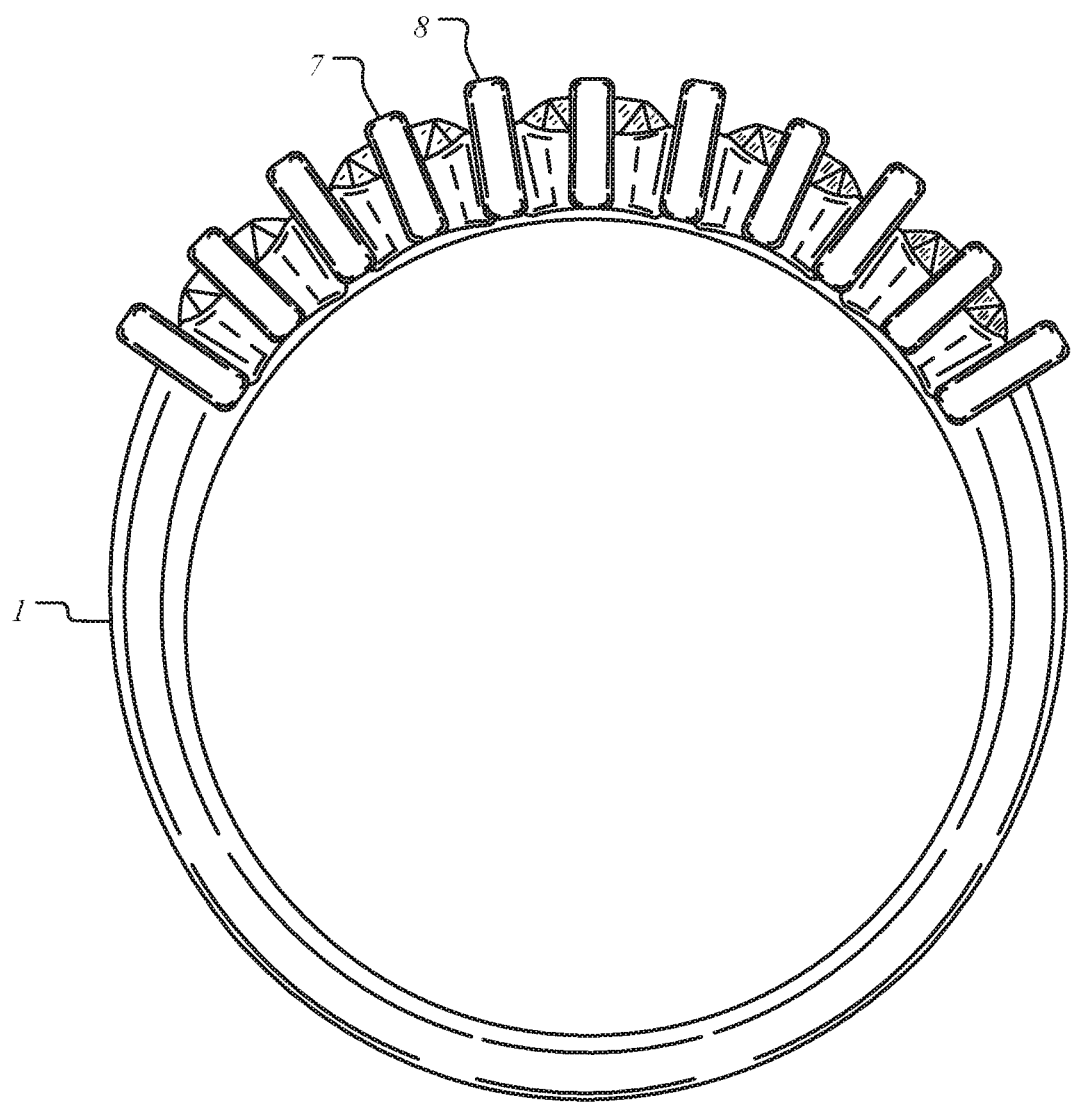
FIG. 2 display a side view of FIG. 1.

FIG. 2 offers a side view of the jewelry accessory displayed in FIG. 1. The framework 1, prongs 7, and bars 8 are visible.

As shown in FIG. 3, diamonds within the D-Z range are arranged in color gradient order, where the whitest color is on one side of the scale and the most pigmented stone is at the other end, with a slight change in color in the stones between. The unidentified stone would be compared to each stone in the order of the most pigmented to the colorless sample and the user will determine which diamond is the most similar to the unknown specimen in order the grade the unknown specimen. The example in FIG. 3 illustrates in expanded view round brilliant white diamonds ranging in scale from D to I color 2, 3, 4, 5, 9, 10 as would be arranged in framework 1 with bars 8 between each stone in order to prevent color contamination. In such an embodiment, the stones may be arranged in accordance with the following color value in the D-Z color scale for each stone: D 2, E 3, F 4, G 5, H 9, and I 10.

Alternatively to setting forth round brilliant cut stones, the apparatus may comprise stones cut in one fancy shape but that vary in a color gradient. FIG. 4 illustrates gemstones 11, 12, 13, 14, 15, and 16 cut in a pear fancy shape but varying in accordance with color from lightest to darkest with each stone exhibiting a different color, as the stones are set in the framework 1 of the jewelry accessory with bars 8 between each stone. This embodiment displays how light and color is expressed in stones that are not round or cut as symmetrically as non-fancy diamonds. Color is then more accurately measured for, but not limited to: square, oval, pear, marquise, triangle, step cut, brilliant cut, hexagon, stones.

Fancy Color Calibrating and Grading Apparatus: An embodiment where diamonds outside of the D-Z range will be observed from the scale of "Light" to "Fancy Dark" grading for colored diamonds, or along a similar pale to dark spectrum gradient for shades of another gemstone or shades of multiples types of gemstones. In one embodiment, diamonds would be arranged from the palest in color to the most saturated in color. This embodiment would help identify the exact hue of a colored stone by distinguishing pure colors from their modifying colors which affect value.

Treatment Detecting and Identifying Apparatus for both Diamonds and Gemstones: This embodiment features stones of various treatments, synthetics or imitations which are frequently utilized to elude and deceive experts and the unassuming. This embodiment provides examples of such treatments, synthetics or imitations to help the user detect suspicious materials from untreated materials, especially using side by side comparisons. This includes but is not limited to: imitations, synthetics oiling, impregnating, sugaring, smoking, laser drilling, fracture-filling, surface coating, composite, irradiating, and overgrowing. The stones may be gemstones that may include but are not limited to diamonds, emeralds, rubies, sapphires, opal, tanzanite, tourmaline, and topaz.

Synthetic Detection, Calibration, and Identifying of Synthetics Apparatus: In this embodiment, synthetics and/or lab created versions of naturally occurring materials are arranged so any unknown stone can be compared and identified based on the traits exhibited by the samples in the apparatus. The samples in this embodiment will also be able to identify method of synthesis of certain materials. The gemstones in this embodiment may include but are not limited to, lab grown creations, ceramic imitations, skull melting, flame fusion Verneuil, flux growth, hydrothermal, and sublimation synthetic processes. The stones may be gemstones that may include but are not limited to diamonds, emeralds, rubies, sapphires, opal, tanzanite, tourmaline, and topaz, or imitations thereof.

Figure 5:
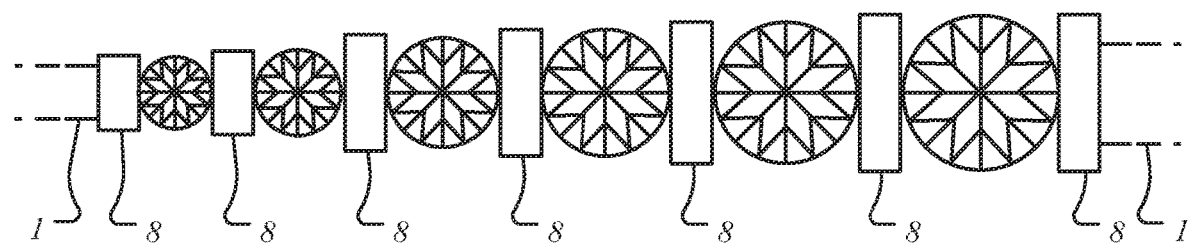
FIG. 5 illustrates a size gradient in which stones may be set in the framework of the jewelry accessory.

Size Calibration and Measurement Comparison Tool: In this embodiment stones of calibrated size, commonly associated gram or carat weight of a material given specific dimensions that are commonly used within the industry, are arranged in a certain pattern with the tool. FIG. 5 illustrates how stones might be arranged within framework 1 in accordance with a size gradient such as by carat measurement or weight. This embodiment offers a range of stones with set diameters or dimensions that can be used for side by side comparison of mounted stones, both side and center stone sizes. The bars 8 between stones preferably are at least as high or slightly higher than the neighboring stone to prevent color contamination. Alternatively, the bars may be as high or slightly higher than the top height of the largest stone. The gemstones of this embodiment can exhibit various shapes, including but not limited to: round, baguettes, triangles, ovals, pears, square, marquise, hexagon, and branded cuts. The gemstones may include but are not limited to diamonds, emeralds, rubies, sapphires, opal, tanzanite, tourmaline, and topaz.

Fluorescence and Phosphorescence Calibration and Grading Apparatus: This embodiment offers common Fluorescent or Phosphorescent reactions of gemstones and diamonds. In this embodiment, stones can be arranged to display and for one to measure the scale of illumination from None to Very Strong, as well display unique colors of certain materials. The scale may progress for fluorescent or phosphorescent reactions from none or inert, faint, medium, strong, very strong, etc. The gemstones may include but are not limited to diamonds, emeralds, rubies, sapphires, opal, tanzanite, tourmaline, and topaz. One may compare an unknown stone to a jewelry apparatus comprising a fluorescence or phosphorescent scale in order to determine certain qualities or value of the unknown stone; such a comparison may be made with an ultraviolet light which could be included in a kit with the jewelry accessory.

The invention claimed is:

1. A jewelry accessory comprising an ordered array of at least four diamonds, wherein said at least four diamonds represent at least four different gradient values on the D-Z color gradient scale, wherein said array comprises at least one arrangement of said at least four diamonds set in gradient value order, wherein said at least four diamonds are round cut, and wherein the jewelry accessory is selected from the group consisting of ring, bracelet, pendant, earing, and necklace.

2. A jewelry accessory comprising an ordered array of at least four diamonds, wherein said at least four diamonds represent at least four different gradient values on the D-Z color gradient scale, wherein said array comprises at least one arrangement of said at least four diamonds set in gradient value order, wherein said at least four diamonds are round cut, and wherein the jewelry accessory is a keychain fob.

3. A jewelry accessory comprising an ordered array of at least four diamonds, wherein said at least four diamonds represent at least four different gradient values on the D-Z color gradient scale, wherein said array comprises at least one arrangement of said at least four diamonds set in gradient value order, wherein said at least four diamonds are round cut, and wherein said jewelry accessory further comprises a diamond exhibiting a color outside the D-Z color gradient scale.

4. The jewelry accessory of claim 3, wherein the jewelry accessory is a ring and said ring further comprises a brown diamond.

5. The jewelry accessory of claim 4, further comprising bars on either side of each stone that extend very slightly higher than the maximum height of each stone.

* * * * *